J. H. DOWNIE.
PAPER CUTTING MACHINE.
APPLICATION FILED SEPT. 10, 1919.
1,347,536.
Patented July 27, 1920.
2 SHEETS—SHEET 1.
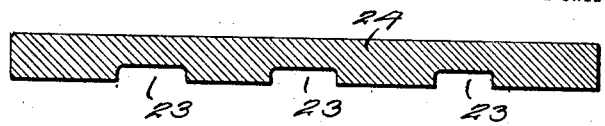
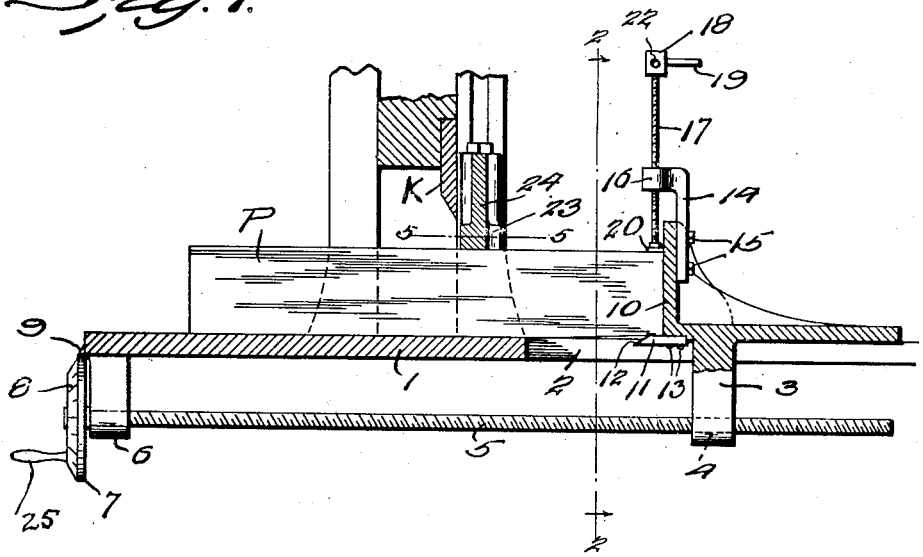
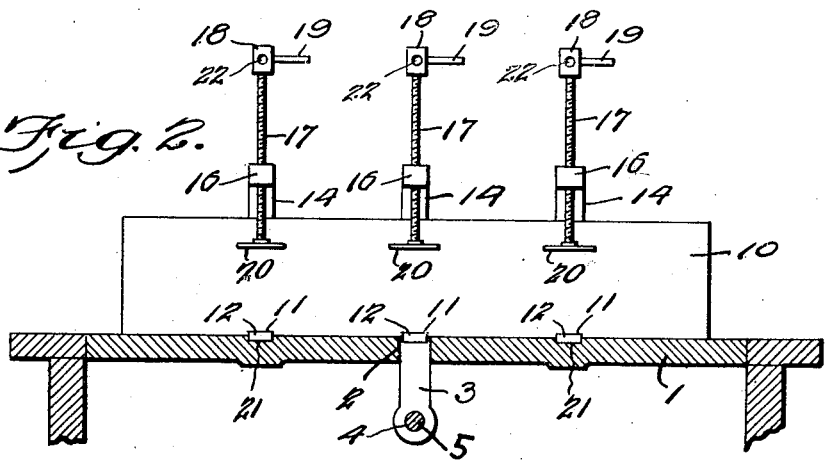
Witness
Inventor
James H. Downie
By Jerry A. Mathews
and Luther Sargent
Attorneys

J. H. DOWNIE.
PAPER CUTTING MACHINE.
APPLICATION FILED SEPT. 10, 1919.

1,347,536.

Patented July 27, 1920.
2 SHEETS—SHEET 2.

Witness

Inventor
James H. Downie

UNITED STATES PATENT OFFICE.

JAMES H. DOWNIE, OF SAN ANTONIO, TEXAS.

PAPER-CUTTING MACHINE.

1,347,536.   Specification of Letters Patent.   Patented July 27, 1920.

Application filed September 10, 1919. Serial No. 322,888.

*To all whom it may concern:*

Be it known that I, JAMES H. DOWNIE, a citizen of the United States, residing at San Antonio, in the county of Bexar and State of Texas, have invented a new and useful Paper-Cutting Machine, of which the following is a specification.

The object of my invention is to provide an improved paper cutting machine capable of performing very accurate cutting, such as the cutting of stock for labels, paper boxes and cartons, where accuracy in obtaining exact widths is necessary. It is a further object of my invention to provide improved means for clamping the paper to be cut to an adjustable gage, with the bottom of the stack of paper spaced slightly above the bed or table of the machine so as to permit the stack of paper to slide freely while the gage is being adjusted. It is a further object of my invention to obviate the necessity of pressing the paper back against the gage after each cut; and to prevent sluing of the sheets.

It is also an object of my invention to provide a novel dial mounted directly on the screw which adjustably operates the gage or stop against which the paper is pressed; and to provide measurement markings on the dial corresponding with the threads on the screw which operates the paper stop or gage and to which screw the dial is attached. In consequence of this improvement a turn of the dial will give a suitable corresponding standard unit of measurement, the device being adapted to utilize any desired unit of measurement. It is a further object of my invention to provide a machine on which measurements may be made in the shortest possible time and more accurately than on paper cutting machines in general use at the present time. The greater accuracy I attain by use of a micrometer dial. It is also my object to provide the improved paper clamping means shown.

I attain these and other objects of my invention by the mechanism illustrated in the accompanying drawings, in which—

Figure 1 is a longitudinal section of the machine;

Fig. 2 is a transverse section on line 2—2 of Fig. 1;

Fig. 5 is a horizontal section on line 5—5 of Fig. 1.

Like numerals designate like parts throughout the several views.

Figure 3:
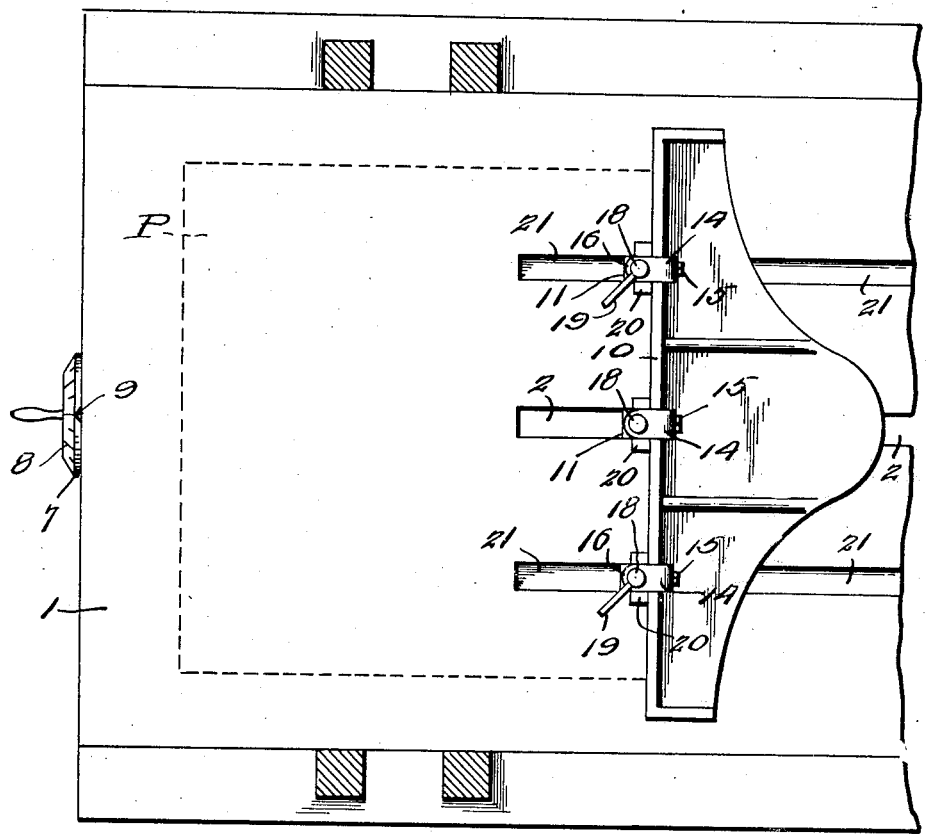
Fig. 3 is a top plan.
Figure 4:
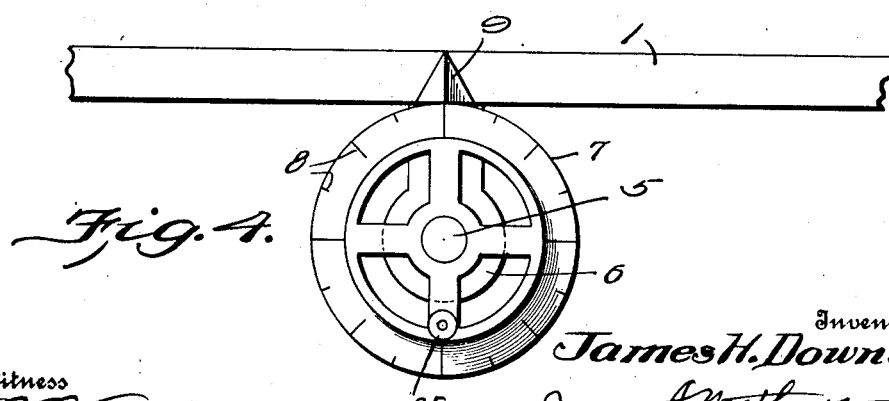
Fig. 4 is a detail view of the dial.

Referring to the accompanying drawings, I provide a suitable table 1 having a longitudinal slot 2, in which travels the downwardly depending lug 3 which has a threaded opening 4 through which the adjusting screw 5 extends. At the end of the table I provide a fixed depending lug 6 to support screw 5. On the outer end of adjusting screw 5 is mounted dial 7 which has a bevel face 8 on which are suitable measurement markings. These markings may be according to any desired standard of measurement, as for example inches, millimeters, etc. Adjusting screw 5 has its thread cut so that one turn of the dial is a standard measured adjustment of the stop 10 against which the paper is passed before being cut, and which stop is integral with or operated by screw 5 and lug 3. Thus one revolution of the dial may represent one inch in the movement of paper stop 10 by means of screw 5 which operatively engages lug 3; a half turn of the dial would in that case represent a half inch shift of paper stop 10, etc. Dial 8 is provided with a suitable handle 25; and on the edge of table 1 I provide a suitable indicator 9 positioned to aline with the bevel face 8 of the dial.

Mounted on the under side of paper stop 10 I provide suitable bottom clamp jaws 11 having their upper faces positioned slightly higher than the upper surface of table 1, and having inclined or beveled free edges 12 to guide the paper onto the upper surface of the clamp jaws 11. Members 11 are rigidly affixed to stop 10 by suitable fastening means such as screws 13.

Table 1 may be provided with suitable longitudinal grooves 21 in which bottom clamps 11 are slidable along the table. Opposed to the bottom jaws 11, I provide upper jaws 20 on the adjustable clamp screws 17 which are mounted in threaded engagement with head 16 of the clamp arm 14, which is attached by bolt 15 to paper stop 10. At the upper ends of screws 17 I provide suitable heads 18 having recesses 22 into which a suitable lever 19 may be inserted to operate the clamps. Any suitable number of clamping devices may be provided, but I prefer to provide the number of clamps shown.

Referring to Figs. 1 and 5 I provide an improved paper clamping and holding bar 24, adapted to be operated in any suitable manner, as by the conventional handwheel and screw, said bar 24 having recesses 23 positioned opposite the clamp screws 17 so that the adjustable clamping device may be operated to a position in immediate proximity to the paper clamping bar 24.

In operating the invention the paper stop or gage 10 is moved longitudinally of the table by means of screw 5, dial wheel 8 and handle 25, as will be apparent by reference to Fig. 1. The stack of paper or cardboard to be cut is freely slidable along the table because lower clamp jaws 11 which engage the bottom edge of the stack have their upper surfaces positioned slightly higher than the upper surface of table 1 over which the paper travels, and the paper is held firmly against movement by the upper clamps 20 carried by the clamping screws 17, which are manually adjustable, and which permit of quick and convenient fastening of the paper in the proper position, where the sheets cannot crawl or slue off. The clamps 20 may be moved into close proximity to the frame on which is mounted the paper clamping bar 24, which is shifted to a position to firmly hold the paper while it is being cut by knife K. By providing a plurality of clamps attached to the paper stop and gage 10 the paper is prevented from drawing forward away from the stop or from crawling out at the center as each cut is made, as paper has a tendency to do with a paper cutter of conventional design. Much more accurate results in cutting paper and especially in cutting small labels and cartons is possible with the improved clamping means which I have disclosed herein.

By providing an adjusting screw 5 having its threads cut to correspond to a given desired standard unit of measurement corresponding with the markings on the dial wheel 7 by which the screw is operated, much time may be saved in adjusting the paper stop to the desired position, and far more accurate work may be done than with machines employing a cable, the length of which is subject to variations depending on the weather. I attain a further advantage by providing the bevel face 8 on the dial and the indicator 9, so that the dial may be quickly and conveniently read by the person standing before same while in an erect position.

What I claim is:

1. In a paper cutting machine, the combination of a table having longitudinally extending grooves therein, an adjustable paper gage slidably mounted on the table, bottom clamp jaws mounted on the under side of said paper gage, said jaws having their upper faces positioned slightly higher than the upper surface of the table and having beveled free edges to guide the paper on to the upper surface of the clamp jaws, and a plurality of means for clamping and holding the stack of papers upon said jaws.

2. In combination with the apparatus described in claim 1, a screw in operative connection with the paper gage, a dial wheel to operate the screw said dial wheel having measurement markings of a predetermined relation to the threads of the screw whereby accurate adjustment of the paper gage may be conveniently and accurately effected by a given rotation of the dial for measuring the paper to be cut, and an indicator mounted on the edge of the table and in position to aline with the edge of the marked portion of the dial, whereby the adjustment of the dial may be determined at a glance.

3. In a paper cutting machine, the combination of a table, a slide gage, bottom means for securely clamping the stack of papers to the slide gage with the lower sheet of the stack slightly raised above the surface of the table, said means including beveled edge portions adapted to readily guide the paper under the bottom clamping means, upper adjustable clamping means for holding the stack of papers in contact with the gage, and separate means for clamping and holding the stack of papers when adjusted in position for cutting.

4. In combination with the device described in claim 3, a screw for adjusting the slide gage, a dial wheel mounted on the end of said screw and bearing a single set of measurement markings having a predetermined relation to its threads, and an indicator mounted on the table and alined with the edge of the dial wheel, whereby accurate adjustment of the slide gage and of the paper clamped thereto may be readily effected by a given rotation of the dial without taking other measurements, substantially as shown.

5. In a paper cutting machine, the combination of a table, a gage longitudinally slidable on the table, means for manually adjusting said gage, means mounted on the slide gage for rigidly clamping a stack of paper to said gage, and a second paper clamping means for clamping the paper firmly to the table after it has been adjusted for cutting, said means including a clamping bar having recessed portions adapted to receive the first mentioned paper clamping means mounted on the slide gage, whereby the slide gage may be moved into close proximity to the second clamping means, substantially as set forth.

6. In a paper cutting machine, the combination of a table having a longitudinally-extending slot and longitudinally-extending grooves, a slide gage, said slide gage having a depending lug extending through the slot in the table, an adjusting screw in threaded enagement with the lug, means for operating the adjusting screw, clamping jaws attached to the slide gage and having their faces beveled at the free edges to guide the stack of paper up from the surface of the table, said jaws being slidable in the above mentioned longitudinally extending grooves in the table, and manually adjustable upper clamping means in opposed relation to said jaws, substantially as described.

JAMES H. DOWNIE.